(12) United States Patent
Siev et al.

(10) Patent No.: US 10,059,301 B2
(45) Date of Patent: Aug. 28, 2018

(54) SENSOR ASSEMBLY FOR A VEHICLE OCCUPANT PROTECTION DEVICE

(75) Inventors: Chhay Siev, Macomb, MI (US); Wade J. Sorenson, Macomb, MI (US); Edgar H. Schlaps, Washington, MI (US); Boris Siebeck, Erkner (DE)

(73) Assignee: TRW Vehicle Safety Systems Inc., Washington, MI (US)

( * ) Notice: Subject to any disclaimer, the term of this patent is extended or adjusted under 35 U.S.C. 154(b) by 849 days.

(21) Appl. No.: 13/559,810

(22) Filed: Jul. 27, 2012

(65) Prior Publication Data

US 2013/0048774 A1 Feb. 28, 2013

Related U.S. Application Data

(60) Provisional application No. 61/528,324, filed on Aug. 29, 2011.

(51) Int. Cl.
*B60R 22/40* (2006.01)
*B60R 22/405* (2006.01)

(52) U.S. Cl.
CPC .................................. *B60R 22/405* (2013.01)

(58) Field of Classification Search
CPC . B60R 22/40; B60R 2022/401; G01P 15/032; G01P 15/036
USPC ............. 242/383.2, 383.3, 384, 384.2–384.6
See application file for complete search history.

(56) References Cited

U.S. PATENT DOCUMENTS

| | | | | |
|---|---|---|---|---|
| 3,926,384 A * | 12/1975 | Weman | ........................ | 242/384.6 |
| 3,944,164 A * | 3/1976 | Tibbe | ......................... | 242/383.3 |
| 4,050,644 A * | 9/1977 | Fohl | ........................... | 242/384.4 |
| 4,057,200 A * | 11/1977 | Ubukata et al. | ............ | 242/384.6 |
| 4,087,059 A * | 5/1978 | Lindblad | ..................... | 242/384.4 |
| 4,176,809 A * | 12/1979 | Thomas et al. | ............. | 242/384.6 |
| 4,453,681 A * | 6/1984 | Gueguen et al. | ............. | 242/376 |
| 4,526,328 A * | 7/1985 | Kilpatrick | ................... | 242/383.2 |
| 4,619,417 A * | 10/1986 | Teraoka et al. | ............. | 242/384.6 |
| 5,251,843 A * | 10/1993 | Kielwein et al. | .......... | 242/384.6 |
| 5,443,224 A * | 8/1995 | Patterson et al. | .......... | 242/384.2 |
| 5,495,994 A * | 3/1996 | Rumpf et al. | .............. | 242/384.4 |
| 5,564,520 A * | 10/1996 | Forsythe | .............. | B60N 2/1665 137/38 |
| 5,610,338 A * | 3/1997 | Kato | ....................... | G01P 13/00 200/61.45 R |
| 5,622,327 A * | 4/1997 | Heath et al. | ................ | 242/383.4 |

(Continued)

*Primary Examiner* — Sang K Kim

(74) *Attorney, Agent, or Firm* — Tarolli, Sundheim, Covell & Tummino LLP

(57) ABSTRACT

A vehicle occupant protection device (10) for helping to protect an occupant of a seat of a vehicle includes an inertia member (66) that engages an element (54). The inertia member (66) is movable relative to the element (54) from an unactuated position to an actuated position in response to at least one sensed vehicle condition for activating the occupant protection device (10). A vertical axis (83) extends through the center of mass of the inertia member (66) when the inertia member (66) is in the unactuated position. At least one of the element (54) and the inertia member (66) has at least one planar surface (80) that extends at an angle relative to the vertical axis (54). The inertia member (66) and element (54) are movable relative to one another along the at least one planar surface (80) to place the inertia member (66) in the actuated position to activate the occupant protection device.

18 Claims, 6 Drawing Sheets

(56) References Cited

U.S. PATENT DOCUMENTS

| | | | |
|---|---|---|---|
| 5,744,872 A * | 4/1998 | Cario | G01P 15/093 |
| | | | 200/61.52 |
| 6,216,974 B1 * | 4/2001 | Cendejas | B60R 22/40 |
| | | | 242/384.4 |
| 6,470,746 B1 * | 10/2002 | Murayama et al. | 73/493 |
| 6,732,967 B2 * | 5/2004 | Sumiyashiki | 242/376 |
| 6,957,790 B2 * | 10/2005 | Kielwein et al. | 242/384.6 |
| 7,637,536 B2 * | 12/2009 | Delventhal et al. | 280/806 |
| 2005/0127228 A1 * | 6/2005 | Holbein et al. | 242/383.2 |
| 2009/0033084 A1 * | 2/2009 | Sorensen et al. | 280/806 |
| 2011/0240787 A1 * | 10/2011 | Lee | 242/384.6 |
| 2012/0104138 A1 * | 5/2012 | Lee | 242/384.2 |
| 2014/0008479 A1 * | 1/2014 | Yoshida et al. | 242/383.2 |
| 2014/0158807 A1 * | 6/2014 | Wanwambeke et al. | 242/384.5 |
| 2015/0217722 A1 * | 8/2015 | Osada | B60R 22/41 |
| | | | 242/384.1 |

* cited by examiner

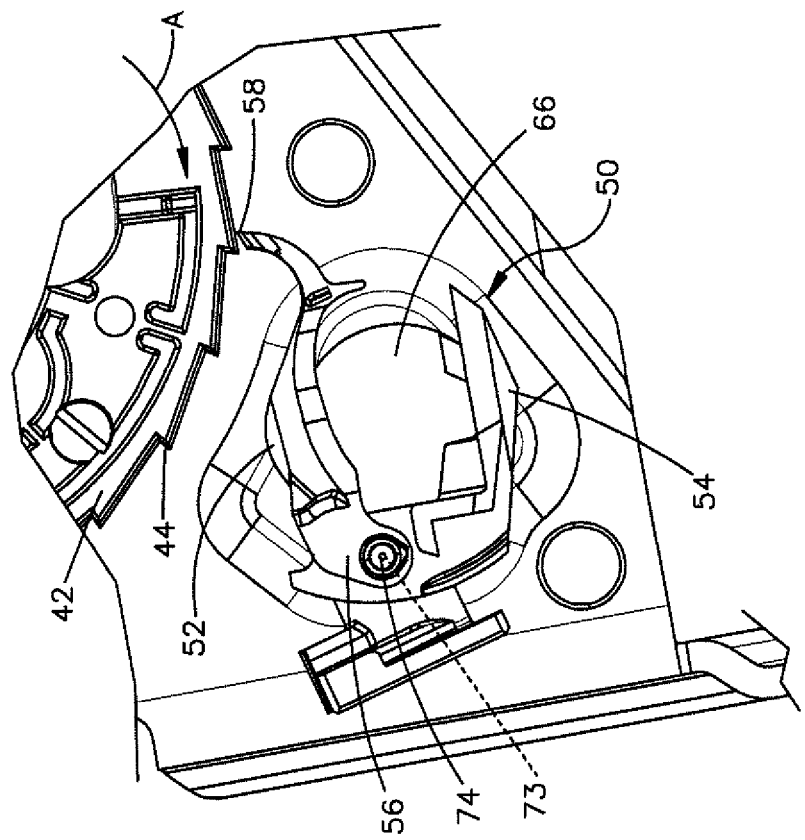
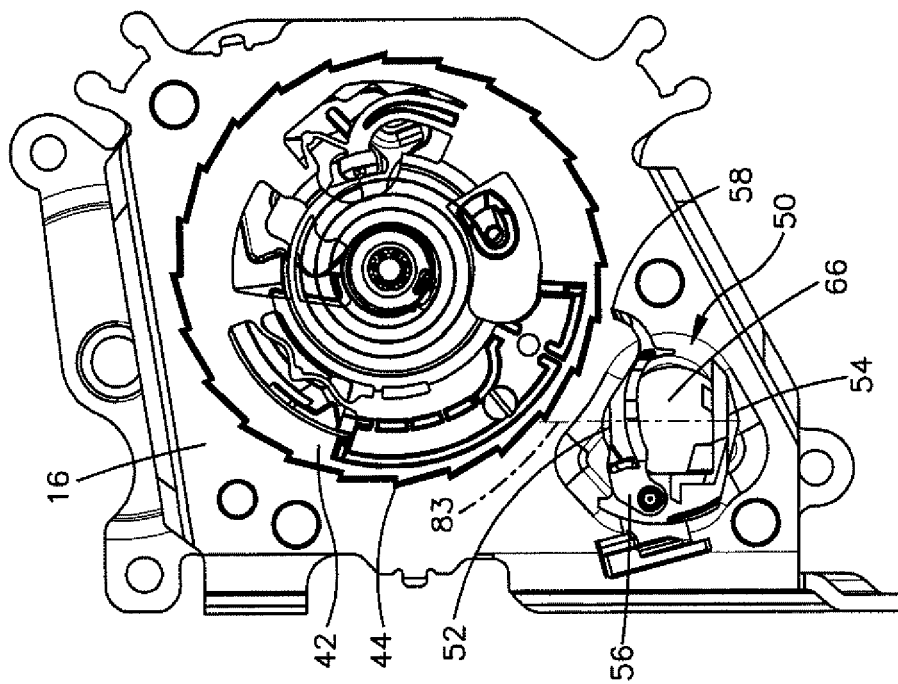
Fig.5A
Fig.5B

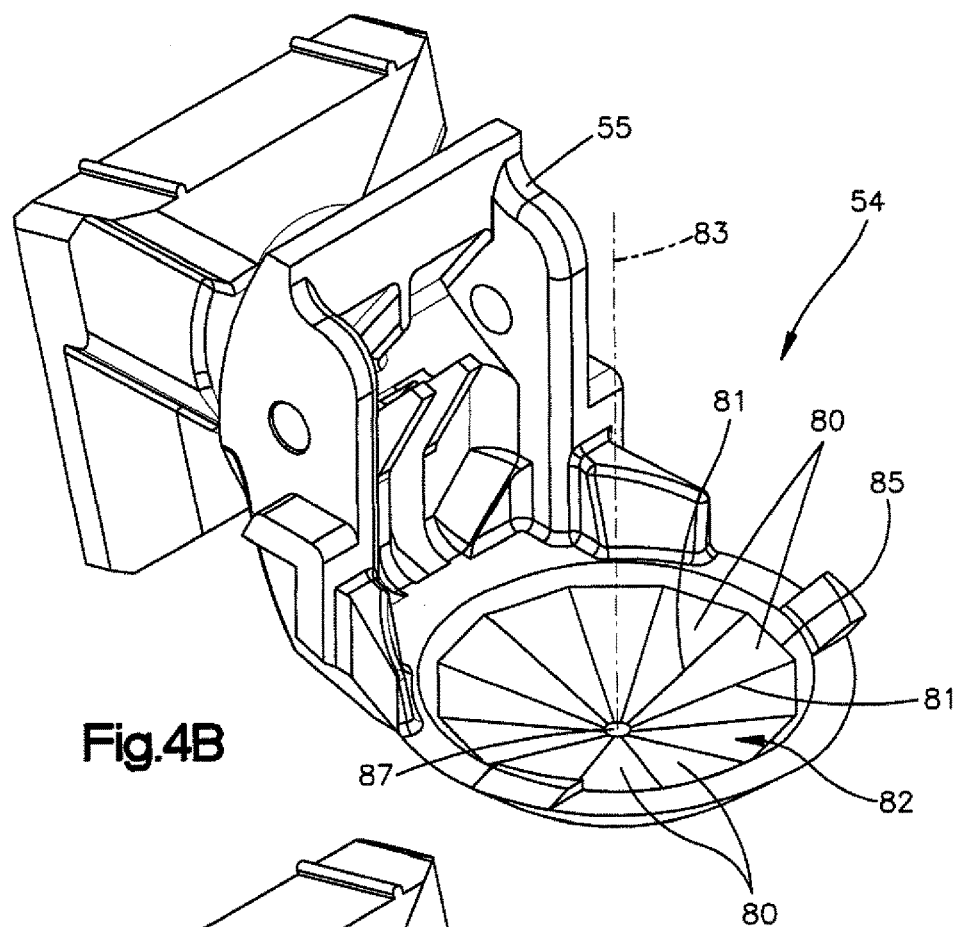
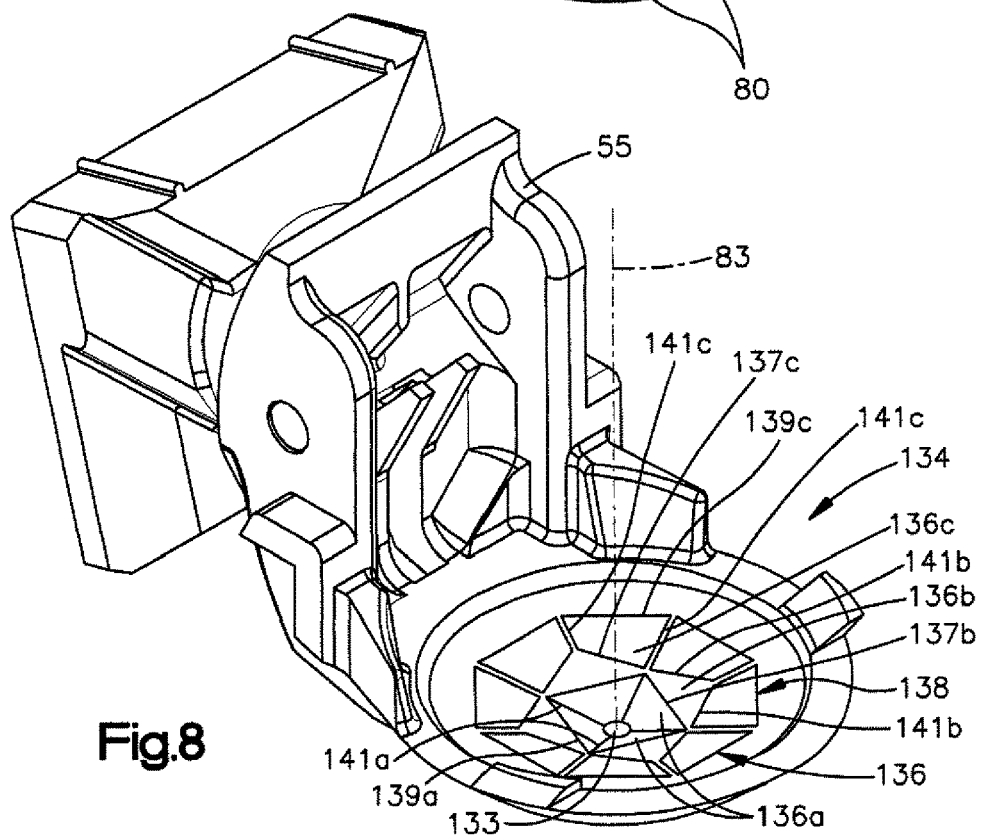

SENSOR ASSEMBLY FOR A VEHICLE OCCUPANT PROTECTION DEVICE

RELATED APPLICATIONS

This application claims priority from U.S. Provisional Application No. 61/528,324, filed Aug. 29, 2011, the entirety of which is incorporated herein by reference.

FIELD OF THE INVENTION

The present invention relates to a vehicle occupant protection device for helping to protect an occupant of a seat of a vehicle. In particular, the present invention relates to a vehicle sensitive sensor assembly for activating the occupant protection device.

BACKGROUND OF THE INVENTION

An occupant protection device for helping to protect an occupant of a seat of a vehicle may include a vehicle sensitive sensor assembly. The vehicle sensitive sensor assembly activates the occupant protection device to help protect the occupant of the seat. The vehicle sensitive sensor assembly is responsive to certain vehicle conditions, such as vehicle deceleration and tilt. The vehicle sensitive sensor may prevent rotation of the spool of a retractor in a belt withdrawal direction in response to sensed vehicle conditions.

The vehicle sensitive sensor assembly may include an inertia member movable relative to a support to prevent rotation of the spool in the belt withdrawal direction. The support may have a spherical cavity. The sensor may cause unwanted or nuisance locking of the spool in response to vehicle conditions, such as vehicle vibration.

SUMMARY OF THE INVENTION

In accordance with the present invention a vehicle occupant protection device for helping to protect an occupant of a seat of a vehicle includes an element and an inertia member that engages the element. The inertia member is movable relative to the element from an unactuated position to an actuated position in response to at least one sensed vehicle condition for activating the occupant protection device. A vertical axis extends through the center of mass of the inertia member when the inertia member is in the unactuated position. At least one of the element and the inertia member has at least one planar surface that extends at an angle relative to the vertical axis. The inertia member and element are movable relative to one another along the at least one planar surface to place the inertia member in the actuated position to activate the occupant protection device.

In accordance with another aspect of the present invention a vehicle occupant protection device for helping to protect an occupant of a seat of a vehicle includes a seat belt webbing retractor. The retractor includes a spool on which seat belt webbing is wound. The spool is supported for rotation about an axis in a belt retraction direction and in an opposite belt withdrawal direction. An inertia locking mechanism is provided for blocking rotation of the spool in the belt withdrawal direction in response to at least one sensed vehicle condition. The inertia locking mechanism includes an inertia member and an element that engages the inertia member. The inertia member is movable relative to the element from an unactuated position to an actuated position in response to the at least one sensed vehicle condition. A vertical axis extends through the center of mass of the inertia member when the inertia member is in the unactuated position. The element has a plurality of planar surfaces that encircle the vertical axis and extend at the same angle relative to the vertical axis. The inertia member is movable along the planar surfaces to place the inertia member in the actuated position to activate the protection device.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 4B is a schematic view of another embodiment of a support element;

FIG. 5A is a schematic view of the retractor of FIG. 1 in a first condition;

FIG. 5B is a schematic view of the retractor of FIG. 1 in a second condition;

FIG. 8 is a schematic view of another embodiment of a support element.

DETAILED DESCRIPTION OF THE INVENTION

Figure 1:
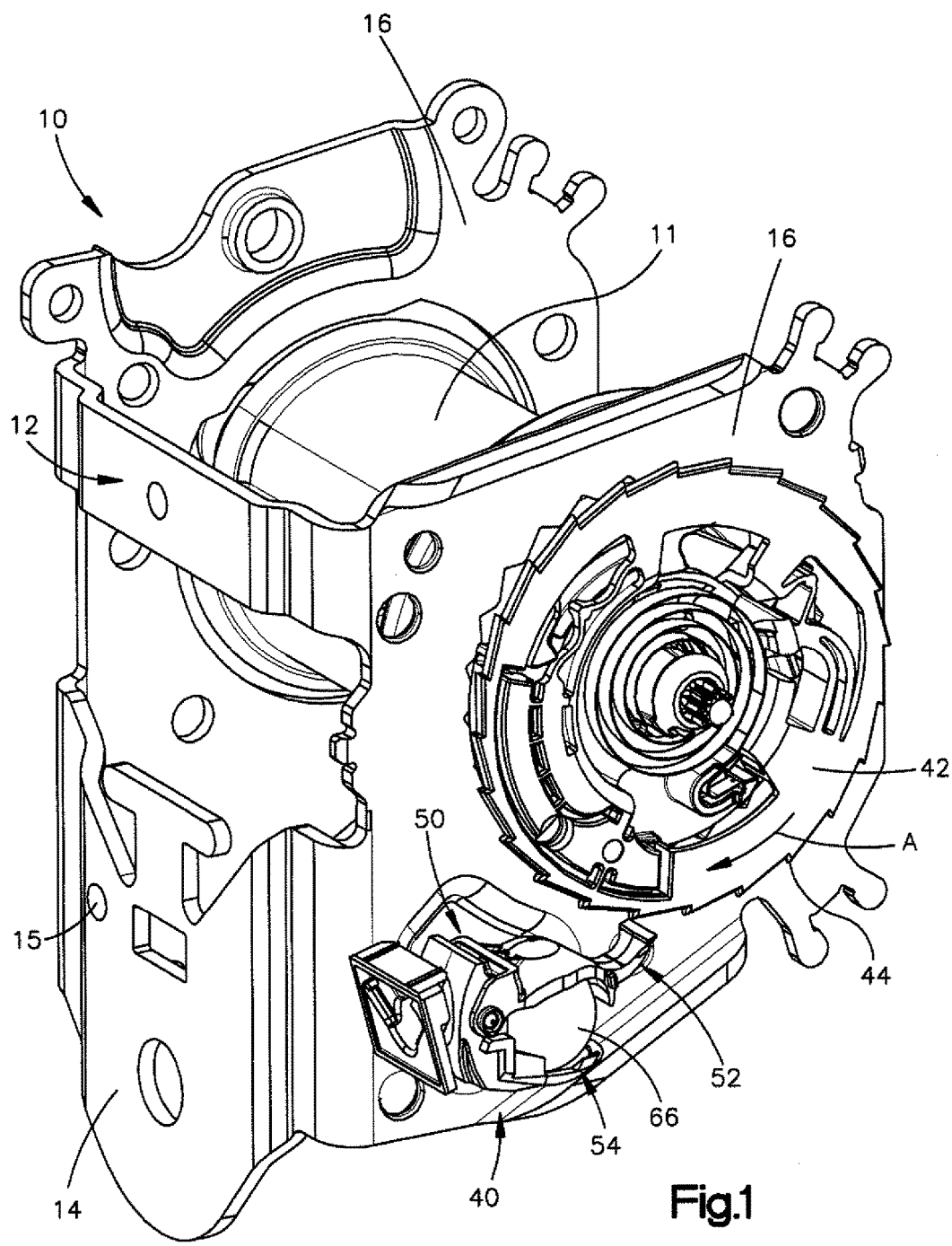
FIG. 1 is a schematic view of an occupant protection device, such as a retractor, constructed in accordance with the present invention for helping to protect an occupant of a seat of a vehicle.
Figure 2:
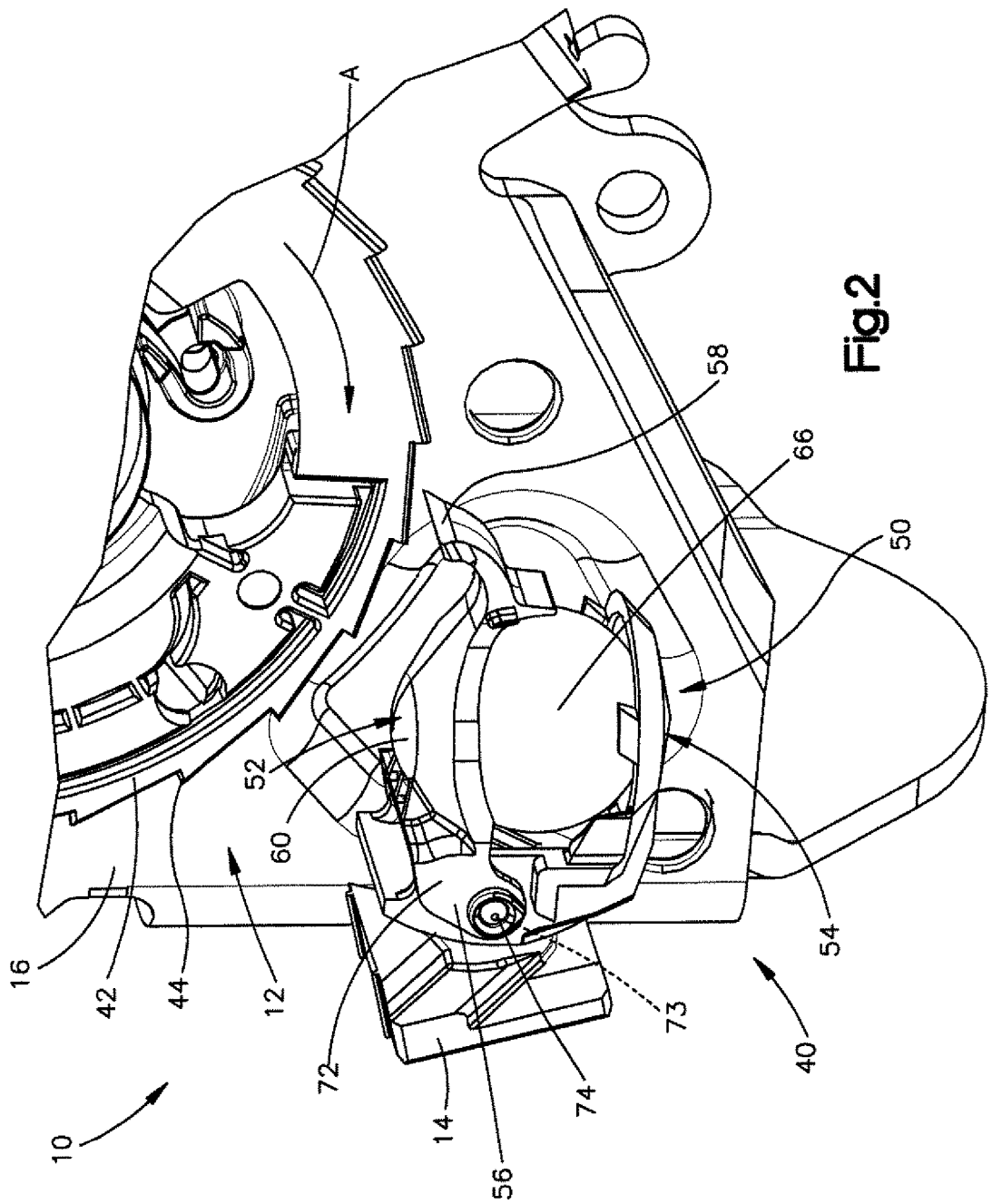
FIG. 2 is an enlarged view of a portion of the retractor of FIG. 1.

The present invention relates to a vehicle occupant protection device for helping to protect an occupant of a seat of a vehicle. In particular, the present invention relates to a vehicle sensitive sensor assembly for activating the occupant protection device. FIGS. 1-2 illustrate a vehicle occupant protection device in accordance with an embodiment of the present invention that includes a seat belt retractor 10 having a generally U-shaped frame 12. The frame 12 includes a base wall 14 and opposite first and second side walls 16. The base wall 14 of the frame 12 includes one or more apertures 15 for receiving a fastener (not shown) to fix the retractor 10 to a vehicle.

The retractor 10 includes a spool 11 that extends between the first and second side walls 16 and is rotatable relative to the frame 12. An end of seat belt webbing (not shown) is wound on the spool 11 in any desired manner. A rewind spring (not shown) biases the spool 11 in a belt retraction direction.

The retractor 10 also includes an inertia locking mechanism 40. The inertia locking mechanism 40 blocks rotation of the spool 11 in a belt withdrawal direction in response to at least one sensed vehicle condition, such as vehicle deceleration and vehicle tilt. The belt withdrawal direction is opposite to the belt retraction direction and is indicated generally by the clockwise arrow A in FIG. 1. The retractor 10 may include other locking mechanisms (not shown) for blocking rotation of the spool 11 in the belt withdrawal direction in response to other sensed conditions, such as belt withdrawal.

As shown in FIG. 2, the locking mechanism 40 includes an actuator disc 42 with ratchet teeth 44. The actuator disc 42 is rotatable relative to the spool 11 and the frame 12. The actuator disc 42 may be mounted for rotation relative to the spool 11 in any desired manner. A locking pawl (not shown) carried by the spool 11 or the actuator disc 42 moves into engagement with one of a plurality of ratchet teeth on the side wall 16 in response to relative rotation between the spool and the actuator disc to block rotation of the spool in the belt withdrawal direction A.

The inertia locking mechanism 40 further includes a vehicle sensitive sensor assembly 50 for sensing vehicle conditions, such as vehicle deceleration and vehicle tilt. The vehicle sensitive sensor assembly 50 is mounted to the frame 12 in proximity to the actuator disc 42. The vehicle sensitive sensor assembly 50 includes a support element 54 and a sensor lever element 52 pivotally connected to the support element.

Figure 3:
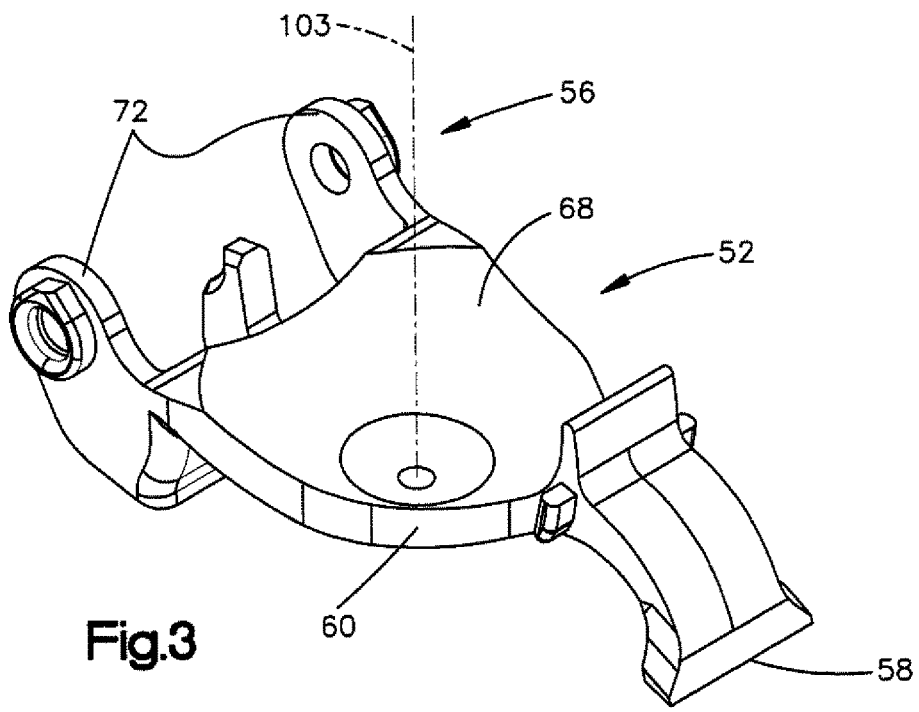
FIG. 3 is a schematic view of a sensor lever element of the retractor of FIG. 1.

As shown in FIG. 3, the sensor lever element 52 extends from a first end 56 to a second end 58 and includes a cap portion 60. The first end 56 of the sensor lever element 52 includes two parallel lever arms 72 that have openings for receiving pivot pins 74 (see FIG. 2) to pivotally connect the sensor lever element to the support element. The pivot pins 74 may be separate elements or may be formed integrally with the sensor lever element 52 (not shown). The second end 58 of the sensor lever element 52 has an elongated shape and extends in a direction that is generally opposite the direction of extension of the lever arms 72. The cap portion 60 is cup-shaped with a concave surface 68 that is centered about a vertical axis 103 extending through the center of the cap portion.

Figure 4A:
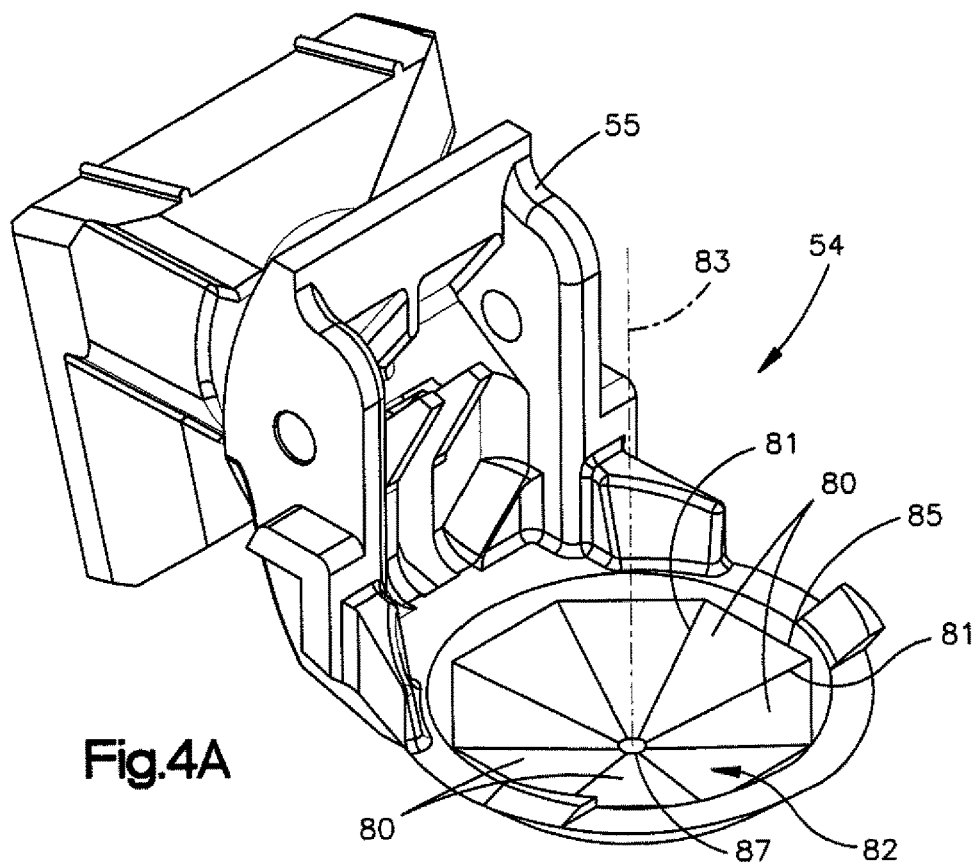
FIG. 4A is a schematic view of a support element of the retractor of FIG. 1.

As shown in FIG. 4A, the support element 54 includes a base portion 55 secured to the frame 12. The support element 54 also includes at least one planar support surface 80 that defines a recess 82. In the exemplary embodiment shown in FIG. 4A, the recess 82 is defined by eight planar support surfaces 80, although more or fewer support surfaces may define the recess, e.g., twelve support surfaces as shown in FIG. 4B. Each planar surface 80 is substantially triangular and extends upwardly from the center of the recess 82 at a desired angle relative to the vertical axis 83. The desired angle may be the same for each planar surface 80 or the planar surfaces may extend at different angles from one another relative to the vertical axis 83. Although the planar surfaces 80 are illustrated as being substantially similar to each other, it is contemplated that the surfaces may have different sizes and shapes from each other, e.g., trapezoidal, rectangular, square, etc.

The planar surfaces 80 are symmetrically positioned about the axis 83 but could alternatively be asymmetrically positioned about the axis (not shown). Regardless, each planar surface 80 includes a pair of edges 81 that converge towards one another in a direction extending towards the axis 83. The edges 81 of each planar surface 80 may converge to a lower portion 87 of the recess 82 centered on the axis or may converge to a common point (not shown) located on the axis 83. An upper edge 85 connects the edges 81 of each planar surface 80. Collectively, the upper edges 85 extend entirely around the axis 83. The edge 81 of one planar surface 80 may be coincident with or spaced from (not shown) the edge 81 of the adjacent planar surface. Likewise, adjacent upper edges 85 may be interconnected with one another or may be spaced from one another (not shown) about the axis 83.

As shown in FIG. 2, the pivot pins 74 support the sensor lever element 52 for pivotal movement relative to the support element 54 about a sensor lever axis 73. When the sensor lever element 52 is pivotally secured to the support element 54, the second end 58 of the sensor lever element projects upward towards the ratchet teeth 44 on the actuator disc 42. Furthermore, in this configuration, the concave surface 68 of the sensor lever element 52 faces towards the recess 82 of the support element 54.

Once the sensor lever element 52 is connected to the support element 54, an inertia member 66 is positioned between the concave surface 68 of the sensor lever element and the recess 82 of the support element such that the sensor lever element and support element engage opposite sides of the inertia member. The inertia member 66 is movable relative to the sensor lever element 52 and support element 54 to actuate the inertia locking mechanism 40. The inertia member 66 constitutes a ball formed from a corrosion resistant metal or other high density material. The support element 54 supports the inertia member 66 for movement between an unactuated position (shown in FIG. 2) in which the spool 11 may rotate in the belt withdrawal direction A and one of a plurality of actuated positions in which the inertia locking mechanism 40 blocks rotation of the spool in the belt withdrawal direction.

Referring to FIG. 5A, under normal vehicle conditions, the inertia member 66 rests near the bottom of the recess 82 of the support element 54. Gravity acts on the sensor lever element 52 to position the cap portion 60 of the sensor lever element upon the inertia member 66. In this initial, unactuated position, the vertical axis 83 extends through the center of mass of the stationary inertia member 66. When the inertia member 66 is in the unactuated position, the second end 58 of the sensor lever element 52 is spaced from the ratchet teeth 44 on the actuator disc 42.

During normal operation of the vehicle, the retractor 10 may experience vibration. The planar surfaces 80 of the support element 54 act to dampen movement of the inertia member 66 relative to the support element and sensor lever element 52 during, e.g., vibration, of the retractor 10 under normal vehicle conditions. When the inertia member 66 moves relative to the support element 54 in response to vibration, the planar, angled configuration of the surfaces 80 acts to stop movement of the inertia member more rapidly and to a greater degree than if the support element had a conical or spherical surface or surfaces, i.e., curved or arcuate surfaces. The planar surfaces 80 are configured to limit vibrational movement of the inertia member 66, which prevents the inertia member from urging the sensor lever element 52 into engagement with the teeth 44 of the actuator disc 42. Therefore, the actuator disc 42 remains free to rotate and, thus, belt webbing withdrawal is still permitted under normal vehicle conditions. Accordingly, the planar surfaces 80 help prevent unwanted or nuisance locking of the retractor 10 due to vehicle conditions, such as vibration, that are different from predetermined vehicle conditions where locking of the retractor is desired.

Referring to FIG. 5B, in the event of a predetermined vehicle condition, e.g., sudden vehicle deceleration or tilt, the inertia member 66 rolls along one or more of the planar surfaces 80 of the support element 54 and relative to the sensor lever element 52 in a generally upward direction. The rolling inertia member 66 exerts an upwardly directed force on the sensor lever element 52 that causes the sensor lever element to pivot upward, i.e., counterclockwise as viewed in FIG. 5B, about the sensor lever axis 73. If the deceleration or tilt of the vehicle is above a predetermined value, the inertia member 66 rolls up the planar surface(s) 80 into an actuated position that causes the second end 58 of the sensor lever 52 to pivot upwards into the path of revolution of the ratchet teeth 44 on the actuator disc 42.

Should the occupant of the seat subsequently move relative to the vehicle seat as a result of the sudden vehicle deceleration or tilt, the occupant engages the belt webbing. Movement of the occupant against the belt webbing results in withdrawal of belt webbing from the retractor 10, thereby causing the retractor spool 11 to rotate in the belt withdrawal direction A. At this time, the actuator disc 42 is fixed for rotation with the spool 11 and, thus, the actuator disc also rotates in the belt withdrawal direction A.

The second end 58 of the sensor lever element 52, which is now disposed in the path of revolution of the ratchet teeth 44 of the actuator disc 42, becomes engaged by one of the moving ratchet teeth. The configuration of the second end 58 of the sensor lever element 52 relative to the pivot axis 73 ensures that the sensor lever element cannot be moved, i.e., pivoted, out of the path of revolution of the actuating disc 42 while the inertia member 66 remains in the actuated position. Moreover, as long as the occupant urges the spool 11 to rotate in the belt withdrawal direction A, the ratchet wheel 44 will maintain the sensor lever element 52 in the upwardly pivoted position regardless of the position of the inertia member.

When the actuator disc 42 is prevented from rotating in the belt withdrawal direction A, the wind-up spring (not shown) in the retractor 10 resists rotation of the spool 11 relative to the locked actuator disc in the belt withdrawal direction. When tension on the seat belt webbing overcomes the bias of the wind-up spring, e.g., when vehicle deceleration causes the vehicle occupant to apply a load on the seat belt webbing, the spool 11 rotates in the belt withdrawal direction A relative to the actuator disc 42, which tensions the wind-up spring.

The relative rotation between the spool 11 and the actuator disc 42 causes the locking pawl (not shown) to pivot into an actuated position engaging the ratchet teeth on the side wall 16 to prevent further rotation of the spool in the belt withdrawal direction A. It is contemplated, however, that rotation of the spool 11 in the belt withdrawal direction A may be prevented in any desired manner in response to movement of the inertia member 66 along the recess 82 from the unactuated position to any one of the actuated positions.

Figure 6:
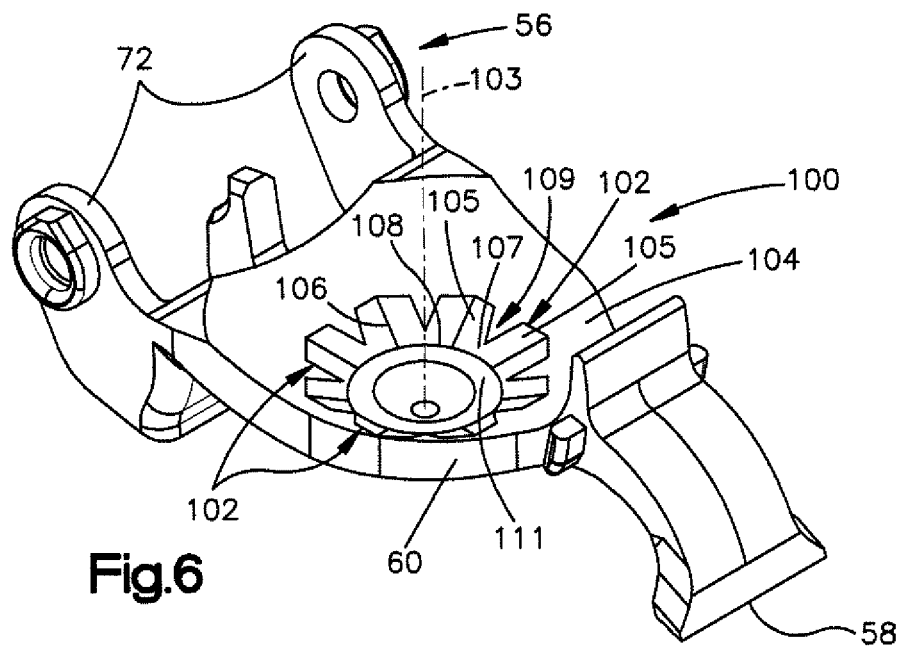
FIG. 6 is a schematic view of an alternative embodiment of a sensor lever element.

An alternative embodiment of a sensor lever element 100 in accordance with the present invention is illustrated in FIG. 6. The sensor lever element 100 of FIG. 6 is generally similar to the sensor lever element 52 of FIGS. 1 and 3. Accordingly, similar numbers will be used to designate similar components of FIG. 6. The sensor lever element 100 is similar to the sensor lever element 52 except that the surface of the sensor lever element 100 that engages the inertia member 66 is different from the concave surface 68 of the sensor lever element 52.

The first end 56 of the sensor lever element 100 of FIG. 6 is pivotally connected to the support element 54. When the sensor lever element 100 is connected to the support element 54, the second end 58 of the sensor lever element projects in a direction toward the ratchet teeth 44 on the actuator disc 42. The cap portion 60 of the sensor lever element 100 extends above and rests upon the inertia member 66 such that the sensor lever element and support element 54 engage opposite sides of the inertia member.

The sensor lever element 100 includes two parallel lever arms 72 that extend from the cap portion 60. The lever arms 72 have openings for receiving pivot pins 74 to pivotally connect the sensor lever element 100 to the support element 54. The pivot pins 74 support the sensor lever element 100 on the support element 54 for pivotal movement about a sensor lever axis (not shown) relative to the support element.

The cap portion 60 of the sensor lever element 100 includes at least one planar surface 102 that helps to define a recess 104. The recess 104 faces toward the inertia member 66 when the cap portion 60 is connected to the support element 54. As shown in FIG. 6, the recess 104 is defined by eight planar surfaces 102 that extend outward from a ring-shaped surface 111 centered about the axis 103. It will be appreciated, however, that more or fewer planar surfaces 102 may define the recess 104. Each planar surface 102 extends at a desired angle relative to the vertical axis 103. The desired angle may be the same for each planar surface 102 or the planar surfaces may extend at different angles from one another relative to the vertical axis 103.

Each planar surface 102 is U-shaped or V-shaped and includes a pair of legs 105 that extend from a base 107 adjacent to the surface 111. Although the planar surfaces 102 are illustrated as being substantially similar to each other, it is contemplated that the surfaces may have different sizes and shapes from each other, e.g., triangular, rectangular, trapezoidal, etc. The base 107 extends around the axis 103 but may alternatively constitute a point from which both legs 105 extend (not shown). Each base 107 includes a lower edge 108 that may be coincident with the surface 111 or may be spaced from the surface 111 (not shown). A notch 109 spaces the legs 105 apart from one another. Each leg 105 includes a lateral edge 106 spaced from the notch 109. The legs 105 diverge from one another in a direction extending away from the axis 103. Alternatively, the legs 105 may converge in a direction extending away from the axis 103 (not shown) or may extend parallel to one another (not shown). The lateral edges 106 of adjacent planar surfaces 102 may be coincident or may be spaced apart from one another (not shown).

Each leg 105 extends at a desired angle from the base 107. The legs 105 of each planar surface 102 may extend at the same angle relative to the base 107 or may extend at different angles from the base. Likewise, each leg 105 of a planar surface 102 extends at a desired angle relative to the axis 103. The angle between each leg 105 and the axis 103 may be the same or may be different. Accordingly, the legs 105 may be symmetrically or asymmetrically positioned about the axis 103. In any case, it will be understood that the planar surfaces 102 of the sensor lever element 100 may extend at the same angle relative to the vertical axis 103 that the planar surfaces 80 extend relative to the vertical axis 83. Alternatively, the planar surfaces 80, 102 may extend at different angles relative to the respective axis 83, 103.

The planar surfaces 102 of the sensor lever element 100 act to dampen movement of the inertia member 66 relative to the support element 54 and sensor lever element during, e.g., vibration, of the retractor 10 under normal vehicle conditions. When the inertia member 66 moves relative to the sensor lever element 100 in response to vibration, the planar, angled configuration of the surfaces 102 acts to stop movement of the inertia member more rapidly and to a greater degree than if the sensor lever element had a conical or spherical surface or surfaces. Accordingly, the planar surfaces 102 help prevent unwanted or nuisance locking of the retractor 10 due to vehicle conditions, such as vibration, that are different from the predetermined vehicle conditions where locking of the retractor is desired.

Figure 7:
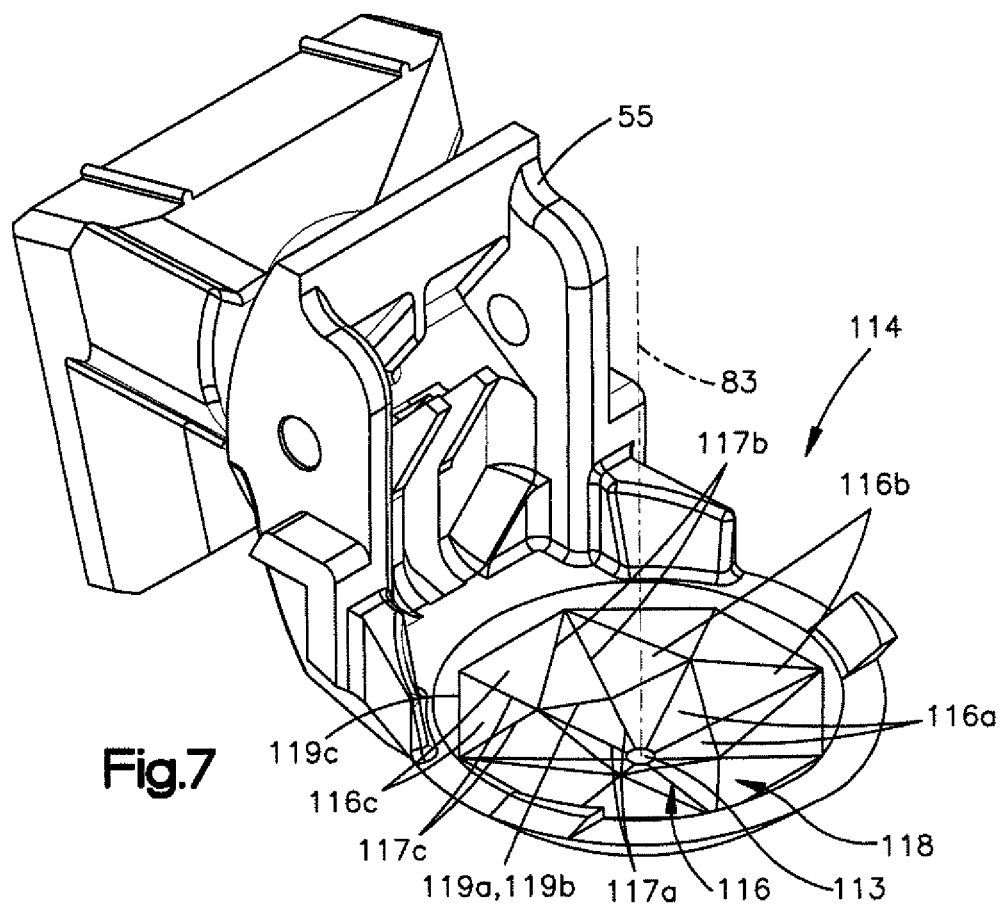
FIG. 7 is a schematic view of an alternative embodiment of a support element.

An alternative embodiment of a support element 114 is illustrated in FIG. 7. The support element 114 of FIG. 7 is generally similar to the support element 54 of FIG. 4A. Accordingly, similar numbers will be used to designate similar components of FIG. 7.

The support element 114 includes at least one planar support surface 116 that helps to define a recess 118. The embodiment of the recess 118 of FIG. 7 has twenty-four planar support surfaces 116, although more or fewer planar support surfaces may define the recess. The planar surfaces 116 include a plurality of first support surfaces 116a extending outwardly from the vertical axis 83. A plurality of second support surfaces 116b extends outwardly from and encircles the first support surfaces 116a. A plurality of third support surfaces 116c extends outwardly from and encircles the second support surfaces 116b. In the embodiment illustrated, for example, eight third planar surfaces 116c encircle eight second planar surfaces 116b, which encircle eight first planar surfaces 116a.

Each first, second, and third planar surface 116a-c is triangular, e.g., isosceles or equilateral, and extends upwardly at a desired angle relative to the vertical axis 83. Although the planar surfaces 116a-c are illustrated as being substantially similar to each other, it is contemplated that the planar surfaces may have different sizes and shapes from each other, e.g., trapezoidal, rectangular, square, etc.

Each first planar surface 116a includes a pair of lateral edges 117a and an upper edge 119a. The lateral edges 117a may converge to a lower portion 113 of the recess 118 or may converge to a common point (not shown) located on the axis 83. The lateral edges 117a of adjacent first planar surfaces 116a may be coincident or may be spaced from one another (not shown). The first planar surfaces 116a may be symmetrically or asymmetrically positioned about the axis 83. The first planar surfaces 116a may extend at the same angle relative to the axis 83 or may extend at different angles from one another relative to the axis.

Likewise, each second planar surface 116b includes a pair of lateral edges 117b and a lower edge 119b. Collectively, the lower edges 119b of the second planar surfaces 116b encircle the axis 83. The lateral edges 117b of adjacent second planar surfaces 116b may be coincident or may be spaced from one another (not shown). The lower edge 119b of each second planar surface 116b may be coincident with the upper edge 119a of the adjacent first planar surface 116a or the edges 119a, 119b may be spaced from one another (not shown). The second planar surfaces 116b may be symmetrically or asymmetrically positioned about the axis 83. Furthermore, the second planar surfaces 116b may extend at the same angle relative to the axis 83 or may extend at different angles from one another relative to the axis.

Each third planar surface 116c includes a pair of lateral edges 117c and an upper edge 119c. Collectively, the upper edges 119c of the third planar surfaces 116c encircle the axis 83. The lateral edges 117c of adjacent third planar surfaces 116c may be coincident or may be spaced from one another (not shown). The lateral edge 117c of each third planar surface 116c may be coincident with the lateral edge 117b of the adjacent second planar surface 116b or the edges 117b, 117c may be spaced from one another (not shown). The third planar surfaces 116c may be symmetrically or asymmetrically positioned about the axis 83. Furthermore, the third planar surfaces 116c may extend at the same angle relative to the axis 83 or may extend at different angles from one another relative to the axis. Accordingly, the first, second, and third planar surfaces 116a-c may extend at the same angle or different angles relative to the axis 83.

The planar surfaces 116 of the support element 114 act to dampen movement of the inertia member 66 relative to the support element and sensor lever element 52 during, e.g., vibration, of the retractor 10 under normal vehicle conditions. The planar surfaces 116a-c may be angled differently relative to the axis 83 in order to provide different degrees of resistance to movement by the inertia member 66 in order to meet desired performance criterion. In any case, when the inertia member 66 moves relative to the support element 114 in response to vibration, the planar, angled configuration of the surfaces 116 acts to stop movement of the inertia member more rapidly and to a greater degree than if the support element had a conical or spherical surface or surfaces. Accordingly, the planar surfaces 116 help prevent unwanted or nuisance locking of the retractor 10 due to vehicle conditions, such as vibration, that are different from the predetermined vehicle conditions where locking of the retractor is desired.

Another alternative embodiment of a support element 134 is illustrated in FIG. 8. The support element 134 of FIG. 8 is generally similar to the support elements 54, 114 of FIGS. 4a and 7. Accordingly, similar numbers will be used to designate similar components of FIG. 8.

The support element 134 includes at least one planar support surface 136 that helps to define a recess 138. The embodiment of the recess 138 of FIG. 8 has sixteen planar support surfaces 136, although more or fewer planar support surfaces may define the recess. The planar surfaces 136 include a plurality of first support surfaces 136a extending outwardly from the vertical axis 83. A plurality of second support surfaces 136b extends outwardly from and encircles the first support surfaces. A plurality of third support surfaces 136c extends outwardly from and encircles the second support surfaces 136b. In the embodiment illustrated, for example, eight third planar surfaces 136c encircle four second planar surfaces 136b, which encircles four first planar surfaces 136a.

Each first and second planar surface 136a, 136b is triangular, e.g., isosceles or equilateral, and extends upwardly at a desired angle relative to the vertical axis 83. Although the planar surfaces 136a, 136b are illustrated as being substantially similar to each other, it is contemplated that the planar surfaces may have different sizes and shapes from each other, e.g., trapezoidal, rectangular, square, etc.

Each first planar surface 136a includes a pair of lateral edges 141a and an upper edge 139a. The lateral edges 141a may converge to a lower portion 133 of the recess 138 or may converge to a common point (not shown) located on the axis 83. The lateral edges 141a of adjacent first planar surfaces 136a may be coincident or may be spaced from one another (not shown). The first planar surfaces 136a may be symmetrically or asymmetrically positioned about the axis 83. The first planar surfaces 136a may extend at the same angle relative to the axis 83 or may extend at different angles from one another relative to the axis.

Each third planar surface 136c is trapezoidal and includes a lower edge 137c, an upper edge 139c, and a pair of lateral edges 141c that connect the lower edge to the upper edge. Collectively, the upper edges 139c of the third planar surfaces 136c encircle the axis 83. The lateral edges 141c of adjacent third planar surfaces 136c may be spaced from one another or may be coincident (not shown). The third planar surfaces 136c may be symmetrically or asymmetrically positioned about the axis 83. Furthermore, the third planar surfaces 136c may extend at the same angle relative to the axis 83 or may extend at different angles from one another relative to the axis.

Each second planar surface 136b is defined between the edges of the first and third planar surfaces 136a, 136c. More specifically, each second planar surface 136b includes a pair of lateral edges 141b defined by the bottom edges 137c of adjacent third planar surfaces 136c. Each second planar surface 136b further includes a lower edge 137b defined by the upper edge 139a of a first planar surface 136a. Alternatively, the second planar surfaces 136b may include edges that are separate and distinct from the edges of the first and third planar surfaces 136a, 136c (not shown). The second planar surfaces 136b may be symmetrically or asymmetrically positioned about the axis 83. Furthermore, the second planar surfaces 136b may extend at the same angle relative to the axis 83 or may extend at different angles from one another relative to the axis. Accordingly, the first, second, and third planar surfaces 136a-c may extend at the same angle or different angles relative to the axis 83 and to one another.

The planar surfaces 136 of the support element 134 act to dampen movement of the inertia member 66 relative to the support element and sensor lever element 52 during, e.g., vibration, of the retractor 10 under normal vehicle conditions. The planar surfaces 136 may be angled differently relative to the axis 83 in order to provide different degrees of resistance to movement by the inertia member 66 in order to meet desired performance criterion. In any case, when the inertia member 66 moves relative to the support element 134 in response to vibration, the planar, angled configuration of the surfaces 136 acts to stop movement of the inertia member more rapidly and to a greater degree than if the support element had a conical or spherical surface or surfaces. Accordingly, the planar surfaces 136 help prevent unwanted or nuisance locking of the retractor 10 due to vehicle conditions, such as vibration, that are different from the predetermined vehicle conditions where locking of the retractor is desired.

The vehicle sensitive sensor assemblies of the present invention may be used to activate any desired vehicle occupant protection device, such as an inflatable vehicle occupant protection device or a seat belt retractor device. It is also contemplated that the planar surfaces may be included in any of the sensor lever element, support element or inertia member of a "standing man" inertia sensor. One example of a "standing man" inertia sensor configuration is illustrated in U.S. Patent Publication No. 2009/0033084, the entirety of which is incorporated by reference. Furthermore, it is contemplated that a sensor lever element with planar surfaces may be used with a support element having a spherical or conical surface as well as with a support element having planar support surfaces.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant protection device for helping to protect an occupant of a seat of a vehicle, comprising:
an element; and
an inertia member that engages the element, the inertia member being movable relative to the element from an unactuated position to an actuated position in response to at least one sensed vehicle condition for activating the occupant protection device, wherein a vertical axis extends through the center of mass of the inertia member when the inertia member is in the unactuated position,
at least one of the element and the inertia member having a plurality of planar surfaces extending at an angle relative to the vertical axis, at least two planar surfaces of the plurality of planar surfaces having coincident edges that extend at an angle relative to the vertical axis, the inertia member and element being movable relative to one another along at least one planar surface of the plurality of planar surfaces to place the inertia member in the actuated position to activate the occupant protection device.

2. A vehicle occupant protection device as set forth in claim 1, wherein the at least one planar surface exhibits one of a triangular shape and a trapezoidal shape.

3. A vehicle occupant protection device as set forth in claim 1, wherein the plurality of planar surfaces that extend at different angles relative to the vertical axis.

4. A vehicle occupant protection device as set forth in claim 1, wherein the plurality of planar surfaces extend at the same angle relative to the vertical axis.

5. A vehicle occupant protection device as set forth in claim 1, wherein the at least one planar surface is provided on the element, the inertia member moving along the at least one planar surface to the actuated position to activate the occupant protection device.

6. A vehicle occupant protection device as set forth in claim 5 wherein the plurality of planar surfaces define a recess.

7. A vehicle occupant protection device as set forth in claim 6 wherein each of the plurality of planar surfaces has a triangular shape with converging edges that converge to a lower portion of the recess, each of the planar surfaces having an upper edge connecting the converging edges.

8. A vehicle occupant protection device as set forth in claim 1, wherein the element comprises a support element on a first side of the inertia member, a sensor lever element being provided on a second side of the inertia member opposite the first side, wherein each of the support element and the sensor lever element includes at least one planar surface for engaging the inertia member.

9. A vehicle occupant protection device as set forth in claim 1, wherein the element is connected to a seat belt retractor, the plurality of planar surfaces acting to dampen movement of the inertia member relative to the element during vibration of the retractor.

10. A vehicle occupant protection device as set forth in claim 1, wherein the plurality of planar surfaces comprise first support surfaces positioned about the vertical axis and second support surfaces positioned radially outward of the first support surfaces.

11. A vehicle occupant protection device as set forth in claim 10, wherein the first support surfaces extend at a first angle from the vertical axis and the second support surfaces extend at a second, different angle relative to the vertical axis.

12. A vehicle occupant protection device as set forth in claim 11, wherein the first and second support surfaces have different shapes from one another.

13. A vehicle occupant protection device as set forth in claim 11, wherein the second support surfaces are spaced from the first support surfaces.

14. A vehicle occupant protection device as set forth in claim 1 further comprising a seat belt retractor associated with the seat of the vehicle, the retractor including:

a spool about which seat belt webbing is wound, the spool being supported for rotation in a belt withdrawal direction and in an opposite belt retraction direction;

the inertia member being movable to the actuated position to prevent rotation of the spool in the belt withdrawal direction in response to the at least one sensed vehicle condition.

15. The vehicle occupant protection device as set forth in claim 14, wherein a sensor lever element is movable into a position for preventing rotation of the spool in the belt withdrawal direction in response to movement of the inertia member relative to the element into the actuated position.

16. The vehicle occupant protection device as set forth in claim 15, wherein the retractor includes an actuator disc having ratchet teeth, the sensor lever element engaging a ratchet tooth of the actuator disc to prevent rotation of the actuator disc and thereby prevent rotation of the spool in the belt withdrawal direction.

17. A vehicle occupant protection device for helping to protect an occupant of a seat of a vehicle comprising:

a seat belt webbing retractor including a spool on which seat belt webbing is wound, the spool being supported for rotation about an axis in a belt retraction direction and in an opposite belt withdrawal direction; and an inertia locking mechanism for blocking rotation of the spool in the belt withdrawal direction in response to at least one sensed vehicle condition, the inertia locking mechanism including an inertia member and an element engaging the inertia member, the inertia member being movable relative to the element from an unactuated position to an actuated position in response to the at least one sensed vehicle condition for activating the occupant protection device, a vertical axis extending through the center of mass of the inertia member when the inertia member is in the unactuated position, the element having a plurality of planar surfaces that encircle the vertical axis and extend at the same angle relative to the vertical axis, at least two planar surfaces of the plurality of planar surfaces having coincident edges that extend at an angle relative to the vertical axis, the inertia member being movable along the planar surfaces to place the inertia member in the actuated position to activate the protection device.

18. A vehicle occupant protection device as set forth in claim 17, wherein the inertia locking mechanism further comprises an actuator disc and a sensor lever element supported for pivotal movement between a disengaged position and an engaged position in engagement with the actuator disc, the sensor lever element moving from the disengaged position to the engaged position in response to movement of the inertia member relative to the element from the unactuated position to the actuated position.

* * * * *